US011990687B2

(12) United States Patent
Rush et al.

(10) Patent No.: US 11,990,687 B2
(45) Date of Patent: May 21, 2024

(54) ULTRA-WIDEBAND ANTENNA HAVING FED AND UNFED ARMS

(71) Applicant: Apple Inc., Cupertino, CA (US)

(72) Inventors: Alden T Rush, San Jose, CA (US); Soroush Akbarzadeh, San Francisco, CA (US); Hongfei Hu, Cupertino, CA (US); Han Wang, Campbell, CA (US); Javier Gomez Tagle, San Jose, CA (US); Ming Chen, Cupertino, CA (US); Carlo Di Nallo, Belmont, CA (US); Mattia Pascolini, San Francisco, CA (US); Erdinc Irci, Sunnyvale, CA (US); Ali Pourghorban Saghati, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/867,504

(22) Filed: Jul. 18, 2022

(65) Prior Publication Data

US 2024/0021986 A1 Jan. 18, 2024

(51) Int. Cl.

| | |
|---|---|
| ***H01Q 5/25*** | (2015.01) |
| ***H01Q 1/24*** | (2006.01) |
| ***H01Q 5/10*** | (2015.01) |
| ***H01Q 5/50*** | (2015.01) |

(52) U.S. Cl.

CPC ................. *H01Q 5/25* (2015.01); *H01Q 1/24* (2013.01); *H01Q 1/242* (2013.01); *H01Q 1/243* (2013.01); *H01Q 5/10* (2015.01); *H01Q 5/50* (2015.01)

(58) Field of Classification Search

CPC .. H01Q 5/25; H01Q 5/10; H01Q 5/50; H01Q 1/38; H01Q 1/243

See application file for complete search history.

(56) References Cited

U.S. PATENT DOCUMENTS

| | | | | |
|---|---|---|---|---|
| 8,963,784 B2 * | 2/2015 | Zhu | .......................... | H01Q 9/30 343/702 |
| 9,331,397 B2 * | 5/2016 | Jin | .......................... | H01Q 1/243 |
| 9,350,077 B1 * | 5/2016 | Zheng | .......................... | H01Q 5/357 |
| 10,249,957 B2 * | 4/2019 | Chang | .......................... | H01Q 13/18 |

(Continued)

FOREIGN PATENT DOCUMENTS

WO 2019135856 A1 7/2019

OTHER PUBLICATIONS

Ultra broadband antenna, Dong et al.—CN-204706645-U (Year: 2015).*

U.S. Appl. No. 17/730,039, filed Apr. 26, 2022.

*Primary Examiner* — Vibol Tan

(74) *Attorney, Agent, or Firm* — Treyz Law Group, P.C.; Michael H. Lyons

(57) ABSTRACT

An electronic device may include an antenna disposed on a substrate. The antenna may include a ring of conductive traces, a fed arm, and an unfed arm. The fed arm and the unfed arm may extend from opposing segments of the ring. The ring may be coupled to ground by fences of conductive vias extending through the substrate. The first arm may have a first radiating edge. The second arm may have a second radiating edge. The first radiating edge may be separated from the second radiating edge by a gap. The first arm may indirectly feed the second arm via near-field electromagnetic coupling across the gap. The first and second arms may collectively radiate in an ultra-wideband (UWB) frequency band.

20 Claims, 9 Drawing Sheets

(56) References Cited

U.S. PATENT DOCUMENTS

| | | | |
|---|---|---|---|
| 10,868,356 | B1 | 12/2020 | Da Costa Bras Lima et al. |
| 10,992,057 | B2 * | 4/2021 | Avser .................... H01Q 21/065 |
| 11,239,550 | B2 | 2/2022 | Cooper et al. |
| 11,303,022 | B2 * | 4/2022 | Avser ........................ H01Q 5/25 |
| 11,322,840 | B2 * | 5/2022 | Wang ........................ H01Q 5/28 |
| 11,335,992 | B2 * | 5/2022 | Edwards ................ H01Q 5/392 |
| 11,594,815 | B2 * | 2/2023 | Irci ........................ H04M 1/026 |
| 2020/0266539 | A1 * | 8/2020 | Cooper .................. H01Q 1/243 |

* cited by examiner

ULTRA-WIDEBAND ANTENNA HAVING FED AND UNFED ARMS

BACKGROUND

This disclosure relates generally to electronic devices and, more particularly, to electronic devices with wireless communications capabilities.

Electronic devices such as portable computers and cellular telephones are often provided with wireless communications capabilities. To satisfy consumer demand for small form factor wireless devices, manufacturers are continually striving to implement wireless communications circuitry such as antenna components using compact structures. At the same time, there is a desire for wireless devices to cover a growing number of communications bands.

Because antennas have the potential to interfere with each other and with components in a wireless device, care must be taken when incorporating antennas into an electronic device. Moreover, care must be taken to ensure that the antennas and wireless circuitry in a device are able to exhibit satisfactory performance over a range of operating frequencies and with satisfactory efficiency bandwidth.

SUMMARY

An electronic device may be provided with wireless circuitry. The wireless circuitry may include antennas. One of the antennas may be disposed on a substrate. The substrate may be mounted to a flexible printed circuit. The antenna may include a ring of conductive traces on the substrate. The antenna may have an antenna resonating element. The antenna resonating element may have a first arm coupled to a first segment of the ring. The ring may be coupled to ground traces by fences of conductive vias.

The antenna resonating element may have a second arm coupled to a second segment of the ring opposite the first arm. The first arm may be fed by a radio-frequency transmission line path at an antenna feed terminal. The second arm may be unfed and is not coupled to a radio-frequency transmission line path. The first arm may have a first radiating edge. The second arm may have a second radiating edge. The first radiating edge may be separated from the second radiating edge by a gap. The first arm may indirectly feed the second arm via near-field electromagnetic coupling across the gap. The first and second arms may collectively radiate in an ultra-wideband (UWB) frequency band.

DETAILED DESCRIPTION

Figure 1:
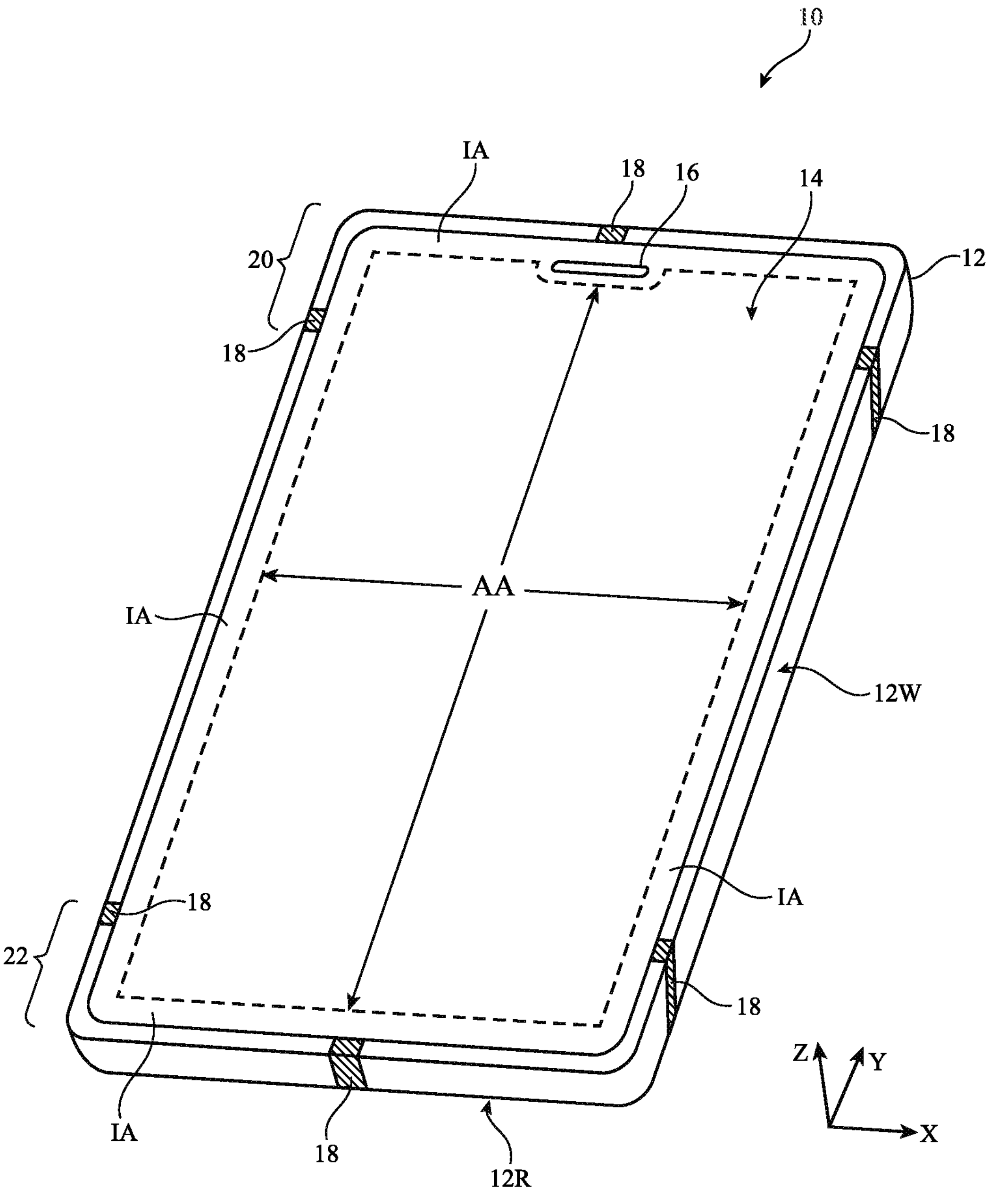
FIG. 1 is a perspective view of an illustrative electronic device in accordance with some embodiments.

An electronic device such as electronic device 10 of FIG. 1 may be provided with wireless circuitry that includes antennas. The antennas may be used to transmit and/or receive wireless radio-frequency signals.

Device 10 may be a portable electronic device or other suitable electronic device. For example, device 10 may be a laptop computer, a tablet computer, a somewhat smaller device such as a wrist-watch device, pendant device, headphone device, earpiece device, headset device, or other wearable or miniature device, a handheld device such as a cellular telephone, a media player, or other small portable device. Device 10 may also be a set-top box, a desktop computer, a display into which a computer or other processing circuitry has been integrated, a display without an integrated computer, a wireless access point, a wireless base station, an electronic device incorporated into a kiosk, building, or vehicle, or other suitable electronic equipment.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may, if desired, have a display such as display 14. Display 14 may be mounted on the front face of device 10. Display 14 may be a touch screen that incorporates capacitive touch electrodes or may be insensitive to touch. The rear face of housing 12 (i.e., the face of device 10 opposing the front face of device 10) may have a substantially planar housing wall such as rear housing wall 12R (e.g., a planar housing wall). Rear housing wall 12R may have slots that pass entirely through the rear housing wall and that therefore separate portions of housing 12 from each other. Rear housing wall 12R may include conductive portions and/or dielectric portions. If desired, rear housing wall 12R may include a planar metal layer covered by a thin layer or coating of dielectric such as glass, plastic, sapphire, or ceramic (e.g., a dielectric cover layer). Housing 12 may also have shallow grooves that do not pass entirely through housing 12. The slots and grooves may be filled with plastic or other dielectric materials. If desired, portions of housing 12 that have been separated from each other (e.g., by a through slot) may be joined by internal conductive structures (e.g., sheet metal or other metal members that bridge the slot).

Housing 12 may include peripheral housing structures such as peripheral structures 12W. Conductive portions of peripheral structures 12W and conductive portions of rear housing wall 12R may sometimes be referred to herein collectively as conductive structures of housing 12. Peripheral structures 12W may run around the periphery of device 10 and display 14. In configurations in which device 10 and display 14 have a rectangular shape with four edges, peripheral structures 12W may be implemented using peripheral housing structures that have a rectangular ring shape with four corresponding edges and that extend from rear housing wall 12R to the front face of device 10 (as an example). In other words, device 10 may have a length (e.g., measured parallel to the Y-axis), a width that is less than the length (e.g., measured parallel to the X-axis), and a height (e.g., measured parallel to the Z-axis) that is less than the width. Peripheral structures 12W or part of peripheral structures 12W may serve as a bezel for display 14 (e.g., a cosmetic trim that surrounds all four sides of display 14 and/or that helps hold display 14 to device 10) if desired. Peripheral structures 12W may, if desired, form sidewall structures for device 10 (e.g., by forming a metal band with vertical sidewalls, curved sidewalls, etc.).

Peripheral structures 12W may be formed of a conductive material such as metal and may therefore sometimes be referred to as peripheral conductive housing structures, conductive housing structures, peripheral metal structures, peripheral conductive sidewalls, peripheral conductive sidewall structures, conductive housing sidewalls, peripheral conductive housing sidewalls, sidewalls, sidewall structures, or a peripheral conductive housing member (as examples). Peripheral conductive housing structures 12W may be formed from a metal such as stainless steel, aluminum, alloys, or other suitable materials. One, two, or more than two separate structures may be used in forming peripheral conductive housing structures 12W.

It is not necessary for peripheral conductive housing structures 12W to have a uniform cross-section. For example, the top portion of peripheral conductive housing structures 12W may, if desired, have an inwardly protruding ledge that helps hold display 14 in place. The bottom portion of peripheral conductive housing structures 12W may also have an enlarged lip (e.g., in the plane of the rear surface of device 10). Peripheral conductive housing structures 12W may have substantially straight vertical sidewalls, may have sidewalls that are curved, or may have other suitable shapes. In some configurations (e.g., when peripheral conductive housing structures 12W serve as a bezel for display 14), peripheral conductive housing structures 12W may run around the lip of housing 12 (i.e., peripheral conductive housing structures 12W may cover only the edge of housing 12 that surrounds display 14 and not the rest of the sidewalls of housing 12).

Rear housing wall 12R may lie in a plane that is parallel to display 14. In configurations for device 10 in which some or all of rear housing wall 12R is formed from metal, it may be desirable to form parts of peripheral conductive housing structures 12W as integral portions of the housing structures forming rear housing wall 12R. For example, rear housing wall 12R of device 10 may include a planar metal structure and portions of peripheral conductive housing structures 12W on the sides of housing 12 may be formed as flat or curved vertically extending integral metal portions of the planar metal structure (e.g., housing structures 12R and 12W may be formed from a continuous piece of metal in a unibody configuration). Housing structures such as these may, if desired, be machined from a block of metal and/or may include multiple metal pieces that are assembled together to form housing 12. Rear housing wall 12R may have one or more, two or more, or three or more portions. Peripheral conductive housing structures 12W and/or conductive portions of rear housing wall 12R may form one or more exterior surfaces of device 10 (e.g., surfaces that are visible to a user of device 10) and/or may be implemented using internal structures that do not form exterior surfaces of device 10 (e.g., conductive housing structures that are not visible to a user of device 10 such as conductive structures that are covered with layers such as thin cosmetic layers, protective coatings, and/or other coating/cover layers that may include dielectric materials such as glass, ceramic, plastic, or other structures that form the exterior surfaces of device 10 and/or serve to hide peripheral conductive housing structures 12W and/or conductive portions of rear housing wall 12R from view of the user).

Display 14 may have an array of pixels that form an active area AA that displays images for a user of device 10. For example, active area AA may include an array of display pixels. The array of pixels may be formed from liquid crystal display (LCD) components, an array of electrophoretic pixels, an array of plasma display pixels, an array of organic light-emitting diode display pixels or other light-emitting diode pixels, an array of electrowetting display pixels, or display pixels based on other display technologies. If desired, active area AA may include touch sensors such as touch sensor capacitive electrodes, force sensors, or other sensors for gathering a user input.

Display 14 may have an inactive border region that runs along one or more of the edges of active area AA. Inactive area IA of display 14 may be free of pixels for displaying images and may overlap circuitry and other internal device structures in housing 12. To block these structures from view by a user of device 10, the underside of the display cover layer or other layers in display 14 that overlap inactive area IA may be coated with an opaque masking layer in inactive area IA. The opaque masking layer may have any suitable color. Inactive area IA may include a recessed region such as a notch that extends into active area AA. Active area AA may, for example, be defined by the lateral area of a display module for display 14 (e.g., a display module that includes pixel circuitry, touch sensor circuitry, etc.). The display module may have a recess or notch in upper region 20 of device 10 that is free from active display circuitry (i.e., that forms the notch of inactive area IA). The notch may be a substantially rectangular region that is surrounded (defined) on three sides by active area AA and on a fourth side by peripheral conductive housing structures 12W.

Display 14 may be protected using a display cover layer such as a layer of transparent glass, clear plastic, transparent ceramic, sapphire, or other transparent crystalline material, or other transparent layer(s). The display cover layer may have a planar shape, a convex curved profile, a shape with planar and curved portions, a layout that includes a planar main area surrounded on one or more edges with a portion that is bent out of the plane of the planar main area, or other suitable shapes. The display cover layer may cover the entire front face of device 10. In another suitable arrangement, the display cover layer may cover substantially all of the front face of device 10 or only a portion of the front face of device 10. Openings may be formed in the display cover layer. For example, an opening may be formed in the display cover layer to accommodate a button. An opening may also be formed in the display cover layer to accommodate ports such as speaker port 16 in the notch or a microphone port. Openings may be formed in housing 12 to form communications ports (e.g., an audio jack port, a digital data port, etc.) and/or audio ports for audio components such as a speaker and/or a microphone if desired.

Display 14 may include conductive structures such as an array of capacitive electrodes for a touch sensor, conductive lines for addressing pixels, driver circuits, etc. Housing 12 may include internal conductive structures such as metal frame members and a planar conductive housing member (sometimes referred to as a conductive support plate or backplate) that spans the walls of housing 12 (e.g., a substantially rectangular sheet formed from one or more metal parts that is welded or otherwise connected between opposing sides of peripheral conductive housing structures 12W). The conductive support plate may form an exterior rear surface of device 10 or may be covered by a dielectric cover layer such as a thin cosmetic layer, protective coating, and/or other coatings that may include dielectric materials such as glass, ceramic, plastic, or other structures that form the exterior surfaces of device 10 and/or serve to hide the conductive support plate from view of the user (e.g., the conductive support plate may form part of rear housing wall 12R). Device 10 may also include conductive structures such as printed circuit boards, components mounted on printed circuit boards, and other internal conductive structures. These conductive structures, which may be used in forming a ground plane in device 10, may extend under active area AA of display 14, for example.

In regions 22 and 20, openings may be formed within the conductive structures of device 10 (e.g., between peripheral conductive housing structures 12W and opposing conductive ground structures such as conductive portions of rear housing wall 12R, conductive traces on a printed circuit board, conductive electrical components in display 14, etc.). These openings, which may sometimes be referred to as gaps, may be filled with air, plastic, and/or other dielectrics and may be used in forming slot antenna resonating elements for one or more antennas in device 10, if desired.

Conductive housing structures and other conductive structures in device 10 may serve as a ground plane for the antennas in device 10. The openings in regions 22 and 20 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element from the ground plane, may contribute to the performance of a parasitic antenna resonating element, or may otherwise serve as part of antenna structures formed in regions 22 and 20. If desired, the ground plane that is under active area AA of display 14 and/or other metal structures in device 10 may have portions that extend into parts of the ends of device 10 (e.g., the ground may extend towards the dielectric-filled openings in regions 22 and 20), thereby narrowing the slots in regions 22 and 20. Region 22 may sometimes be referred to herein as lower region 22 or lower end 22 of device 10. Region 20 may sometimes be referred to herein as upper region 20 or upper end 20 of device 10.

In general, device 10 may include any suitable number of antennas (e.g., one or more, two or more, three or more, four or more, etc.). The antennas in device 10 may be located at opposing first and second ends of an elongated device housing (e.g., at lower region 22 and/or upper region 20 of device 10 of FIG. 1), along one or more edges of a device housing, in the center of a device housing, in other suitable locations, or in one or more of these locations. The arrangement of FIG. 1 is merely illustrative.

Portions of peripheral conductive housing structures 12W may be provided with peripheral gap structures. For example, peripheral conductive housing structures 12W may be provided with one or more dielectric-filled gaps such as gaps 18, as shown in FIG. 1. The gaps in peripheral conductive housing structures 12W may be filled with dielectric such as polymer, ceramic, glass, air, other dielectric materials, or combinations of these materials. Gaps 18 may divide peripheral conductive housing structures 12W into one or more peripheral conductive segments. The conductive segments that are formed in this way may form parts of antennas in device 10 if desired. Other dielectric openings may be formed in peripheral conductive housing structures 12W (e.g., dielectric openings other than gaps 18) and may serve as dielectric antenna windows for antennas mounted within the interior of device 10. Antennas within device 10 may be aligned with the dielectric antenna windows for conveying radio-frequency signals through peripheral conductive housing structures 12W. Antennas within device 10 may also be aligned with inactive area IA of display 14 for conveying radio-frequency signals through display 14.

In order to provide an end user of device 10 with as large of a display as possible (e.g., to maximize an area of the device used for displaying media, running applications, etc.), it may be desirable to increase the amount of area at the front face of device 10 that is covered by active area AA of display 14. Increasing the size of active area AA may reduce the size of inactive area IA within device 10. This may reduce the area behind display 14 that is available for antennas within device 10. For example, active area AA of display 14 may include conductive structures that serve to block radio-frequency signals handled by antennas mounted behind active area AA from radiating through the front face of device 10. It would therefore be desirable to be able to provide antennas that occupy a small amount of space within device 10 (e.g., to allow for as large of a display active area AA as possible) while still allowing the antennas to communicate with wireless equipment external to device 10 with satisfactory efficiency bandwidth.

In a typical scenario, device 10 may have one or more upper antennas and one or more lower antennas. An upper antenna may, for example, be formed in upper region 20 of device 10. A lower antenna may, for example, be formed in lower region 22 of device 10. Additional antennas may be formed along the edges of housing 12 extending between regions 20 and 22 if desired. An example in which device 10 includes three or four upper antennas and five lower antennas is described herein as an example. The antennas may be used separately to cover identical communications bands, overlapping communications bands, or separate communications bands. The antennas may be used to implement an antenna diversity scheme or a multiple-input-multiple-output (MIMO) antenna scheme. Other antennas for covering any other desired frequencies may also be mounted at any desired locations within the interior of device 10. The example of FIG. 1 is merely illustrative. If desired, housing 12 may have other shapes (e.g., a square shape, cylindrical shape, spherical shape, combinations of these and/or different shapes, etc.).

Figure 2:
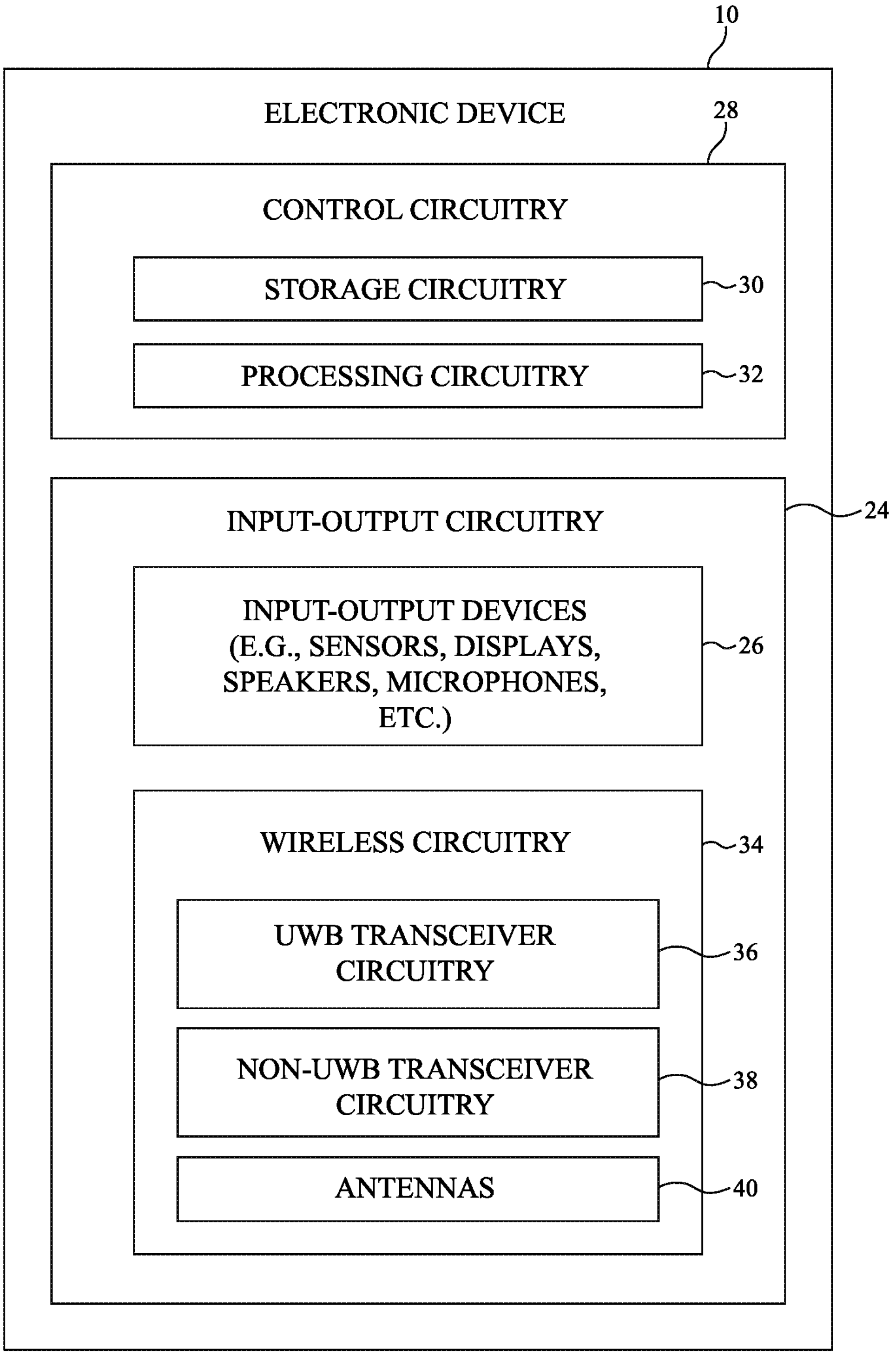
FIG. 2 is a schematic diagram of illustrative circuitry in an electronic device in accordance with some embodiments.

A schematic diagram of illustrative components that may be used in device 10 is shown in FIG. 2. As shown in FIG. 2, device 10 may include control circuitry 28. Control circuitry 28 may include storage such as storage circuitry 30. Storage circuitry 30 may include hard disk drive storage, nonvolatile memory (e.g., flash memory or other electrically-programmable-read-only memory configured to form a solid-state drive), volatile memory (e.g., static or dynamic random-access-memory), etc.

Control circuitry 28 may include processing circuitry such as processing circuitry 32. Processing circuitry 32 may be used to control the operation of device 10. Processing circuitry 32 may include on one or more processors such as microprocessors, microcontrollers, digital signal processors, host processors, baseband processor integrated circuits, application specific integrated circuits, central processing units (CPUs), graphics processing units, etc. Control circuitry 28 may be configured to perform operations in device 10 using hardware (e.g., dedicated hardware or circuitry), firmware, and/or software. Software code for performing operations in device 10 may be stored on storage circuitry 30 (e.g., storage circuitry 30 may include non-transitory (tangible) computer readable storage media that stores the software code). The software code may sometimes be referred to as program instructions, software, data, instructions, or code. Software code stored on storage circuitry 30 may be executed by processing circuitry 32.

Control circuitry 28 may be used to run software on device 10 such as internet browsing applications, voice-over-internet-protocol (VOIP) telephone call applications, email applications, media playback applications, operating system functions, etc. To support interactions with external equipment, control circuitry 28 may be used in implementing communications protocols. Communications protocols that may be implemented using control circuitry 28 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 3GPP Fifth Generation (5G) New Radio (NR) protocols, etc.), antenna diversity protocols, satellite navigation system protocols (e.g., global positioning system (GPS) protocols, global navigation satellite system (GLONASS) protocols, etc.), antenna-based spatial ranging protocols, or any other desired communications protocols. Each communication protocol may be associated with a corresponding radio access technology (RAT) that specifies the physical connection methodology used in implementing the protocol.

Device 10 may include input-output circuitry 24. Input-output circuitry 24 may include input-output devices 26. Input-output devices 26 may be used to allow data to be supplied to device 10 and to allow data to be provided from device 10 to external devices. Input-output devices 26 may include user interface devices, data port devices, sensors, and other input-output components. For example, input-output devices may include touch screens, displays without touch sensor capabilities, buttons, joysticks, scrolling wheels, touch pads, key pads, keyboards, microphones, cameras, speakers, status indicators, light sources, audio jacks and other audio port components, digital data port devices, light sensors, gyroscopes, accelerometers or other components that can detect motion and device orientation relative to the Earth, capacitance sensors, proximity sensors (e.g., a capacitive proximity sensor and/or an infrared proximity sensor), magnetic sensors, and other sensors and input-output components.

Input-output circuitry 24 may include wireless circuitry such as wireless circuitry 34 for wirelessly conveying radio-frequency signals. While control circuitry 28 is shown separately from wireless circuitry 34 in the example of FIG. 2 for the sake of clarity, wireless circuitry 34 may include processing circuitry that forms a part of processing circuitry 32 and/or storage circuitry that forms a part of storage circuitry 30 of control circuitry 28 (e.g., portions of control circuitry 28 may be implemented on wireless circuitry 34). As an example, control circuitry 28 may include baseband processor circuitry (e.g., one or more baseband processors) or other control components that form a part of wireless circuitry 34.

Wireless circuitry 34 may include radio-frequency (RF) transceiver circuitry formed from one or more integrated circuits, power amplifier circuitry, low-noise input amplifiers, passive RF components, one or more antennas, transmission lines, and other circuitry for handling RF wireless signals (e.g., one or more RF front end modules, etc.). Wireless signals can also be sent using light (e.g., using infrared communications).

Wireless circuitry 34 may include radio-frequency transceiver circuitry for handling transmission and/or reception of radio-frequency signals within corresponding frequency bands at radio frequencies (sometimes referred to herein as communications bands or simply as "bands"). For example, wireless circuitry 34 may include ultra-wideband (UWB) transceiver circuitry 36 that supports communications using the IEEE 802.15.4 protocol and/or other ultra-wideband communications protocols. Ultra-wideband radio-frequency signals may be based on an impulse radio signaling scheme that uses band-limited data pulses. Ultra-wideband signals may have any desired bandwidths such as bandwidths between 499 MHz and 1331 MHz, bandwidths greater than 500 MHz, etc. The presence of lower frequencies in the baseband may sometimes allow ultra-wideband signals to penetrate through objects such as walls. In an IEEE 802.15.4 system, a pair of electronic devices may exchange wireless time stamped messages. Time stamps in the messages may be analyzed to determine the time of flight of the messages and thereby determine the distance (range) between the devices and/or an angle between the devices (e.g., an angle of arrival of incoming radio-frequency signals). Ultra-wideband transceiver circuitry 36 may operate (i.e., convey radio-frequency signals) in frequency bands such as an ultra-wideband communications band between about 5 GHz and about 8.5 GHz (e.g., a 6.5 GHz UWB communications band, an 8 GHz UWB communications band, and/or at other suitable frequencies).

As shown in FIG. 2, wireless circuitry 34 may also include non-UWB transceiver circuitry 38. Non-UWB transceiver circuitry 38 may handle communications bands other than UWB communications bands such as wireless local area network (WLAN) frequency bands (e.g., Wi-Fi® (IEEE 802.11) or other WLAN communications bands) including a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands including the 2.4 GHz Bluetooth® band or other WPAN communications bands, cellular telephone frequency bands (e.g., bands from about 600 MHz to about 5 GHz, 3G bands, 4G LTE bands, 5G New Radio Frequency Range 1 (FR1) bands below 10 GHz, 5G New Radio Frequency Range 2 (FR2) bands between 20 and 60 GHz, etc.), other centimeter or millimeter wave frequency bands between 10-300 GHz, near-field communications frequency bands (e.g., at 13.56 MHz), satellite navigation frequency bands (e.g., a GPS band from 1565 to 1610 MHz, a Global Navigation Satellite System (GLONASS) band, a BeiDou Navigation Satellite System (BDS) band, etc.), communications bands under the family of 3GPP wireless communications standards, communications bands under the IEEE 802.XX family of standards, industrial, scientific, and medical (ISM) bands such as an ISM band between around 900 MHz and 950 MHz or other ISM bands below or above 1 GHz, one or more unlicensed bands, one or more bands reserved for emergency and/or public services, and/or any other desired frequency bands of interest. Non-UWB transceiver circuitry 38 may also be used to perform spatial ranging operations if desired.

UWB transceiver circuitry 36 and non-UWB transceiver circuitry 38 may include respective transceivers (e.g., transceiver integrated circuits or chips) that handle each of these frequency bands or any desired number of transceivers that handle two or more of these frequency bands. In scenarios where different transceivers are coupled to the same antenna, filter circuitry (e.g., duplexer circuitry, diplexer circuitry, low pass filter circuitry, high pass filter circuitry, band pass filter circuitry, band stop filter circuitry, etc.), switching circuitry, multiplexing circuitry, or any other desired circuitry may be used to isolate radio-frequency signals conveyed by each transceiver over the same antenna (e.g., filtering circuitry or multiplexing circuitry may be interposed on a radio-frequency transmission line shared by the transceivers). The transceiver circuitry may include one or more integrated circuits (chips), integrated circuit packages (e.g., multiple integrated circuits mounted on a common printed circuit in a system-in-package device, one or more integrated circuits mounted on different substrates, etc.), power amplifier circuitry, up-conversion circuitry, down-conversion circuitry, low-noise input amplifiers, passive radio-frequency components, switching circuitry, transmission line structures, and other circuitry for handling radio-frequency signals and/or for converting signals between radio-frequencies, intermediate frequencies, and/or baseband frequencies.

As shown in FIG. 2, wireless circuitry 34 may include antennas 40. UWB transceiver circuitry 36 and non-UWB transceiver circuitry 38 may convey radio-frequency signals using one or more antennas 40 (e.g., antennas 40 may convey the radio-frequency signals for the transceiver circuitry). The term "convey radio-frequency signals" as used herein means the transmission and/or reception of the radio-frequency signals (e.g., for performing unidirectional and/or bidirectional wireless communications with external wireless communications equipment). Antennas 40 may transmit the radio-frequency signals by radiating the radio-frequency signals into free space (or to freespace through intervening device structures such as a dielectric cover layer). Antennas 40 may additionally or alternatively receive the radio-frequency signals from free space (e.g., through intervening devices structures such as a dielectric cover layer). The transmission and reception of radio-frequency signals by antennas each involve the excitation or resonance of antenna currents on an antenna resonating element in the antenna by the radio-frequency signals within the frequency band(s) of operation of the antenna.

Antennas 40 in wireless circuitry 34 may be formed using any suitable antenna types. For example, antennas 40 may include antennas with resonating elements that are formed from stacked patch antenna structures, loop antenna structures, patch antenna structures, inverted-F antenna structures, slot antenna structures, planar inverted-F antenna structures, waveguide structures, monopole antenna structures, dipole antenna structures, helical antenna structures, Yagi (Yagi-Uda) antenna structures, hybrids of these designs, etc. In another suitable arrangement, antennas 40 may include antennas with dielectric resonating elements such as dielectric resonator antennas. If desired, one or more of antennas 40 may be cavity-backed antennas. Two or more antennas 40 may be arranged in a phased antenna array if desired (e.g., for conveying centimeter and/or millimeter wave signals). Different types of antennas may be used for different bands and combinations of bands. In one suitable arrangement that is described herein as an example, antennas 40 include a UWB antenna having a fed arm (e.g., a planar inverted-F antenna arm) and an un-fed arm (e.g., a grounded planar arm or parasitic arm).

Figure 3:
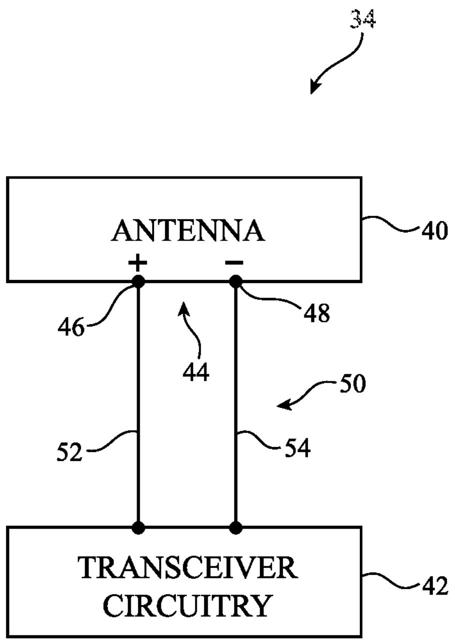
FIG. 3 is a schematic diagram of illustrative wireless circuitry in accordance with some embodiments.

A schematic diagram of wireless circuitry 34 is shown in FIG. 3. As shown in FIG. 3, wireless circuitry 34 may include transceiver circuitry 42 (e.g., UWB transceiver circuitry 36 or non-UWB transceiver circuitry 38 of FIG. 2) that is coupled to a given antenna 40 using a radio-frequency transmission line path such as radio-frequency transmission line path 50.

To provide antenna structures such as antenna 40 with the ability to cover different frequencies of interest, antenna 40 may be provided with circuitry such as filter circuitry (e.g., one or more passive filters and/or one or more tunable filter circuits). Discrete components such as capacitors, inductors, and resistors may be incorporated into the filter circuitry. Capacitive structures, inductive structures, and resistive structures may also be formed from patterned metal structures (e.g., part of an antenna). If desired, antenna 40 may be provided with adjustable circuits such as tunable components that tune the antenna over communications (frequency) bands of interest. The tunable components may be part of a tunable filter or tunable impedance matching network, may be part of an antenna resonating element, may span a gap between an antenna resonating element and antenna ground, etc.

Radio-frequency transmission line path 50 may include one or more radio-frequency transmission lines (sometimes referred to herein simply as transmission lines). Radio-frequency transmission line path 50 (e.g., the transmission lines in radio-frequency transmission line path may include a positive signal conductor such as positive signal conductor 52 and a ground signal conductor such as ground conductor 54.

The transmission lines in radio-frequency transmission line path 50 may, for example, include coaxial cable transmission lines (e.g., ground conductor 54 may be implemented as a grounded conductive braid surrounding signal conductor 52 along its length), stripline transmission lines (e.g., where ground conductor 54 extends along two sides of signal conductor 52), a microstrip transmission line (e.g., where ground conductor 54 extends along one side of signal conductor 52), coaxial probes realized by a metalized via, edge-coupled microstrip transmission lines, edge-coupled stripline transmission lines, waveguide structures (e.g., coplanar waveguides or grounded coplanar waveguides), combinations of these types of transmission lines and/or other transmission line structures, etc.

Transmission lines in radio-frequency transmission line path 50 may be integrated into rigid and/or flexible printed circuit boards. In one suitable arrangement, radio-frequency transmission line path 50 may include transmission line conductors (e.g., signal conductors 52 and ground conductors 54) integrated within multilayer laminated structures (e.g., layers of a conductive material such as copper and a dielectric material such as a resin that are laminated together without intervening adhesive). The multilayer laminated structures may, if desired, be folded or bent in multiple dimensions (e.g., two or three dimensions) and may maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive).

A matching network may include components such as inductors, resistors, and capacitors used in matching the impedance of antenna 40 to the impedance of radio-frequency transmission line path 50. Matching network components may be provided as discrete components (e.g., surface mount technology components) or may be formed from housing structures, printed circuit board structures, traces on plastic supports, etc. Components such as these may also be used in forming filter circuitry in antenna(s) 40 and may be tunable and/or fixed components.

Radio-frequency transmission line path 50 may be coupled to antenna feed structures associated with antenna 40. As an example, antenna 40 may form an inverted-F antenna, a planar inverted-F antenna, a patch antenna, or other antenna having an antenna feed 44 with a positive antenna feed terminal such as positive antenna feed terminal 46 and a ground antenna feed terminal such as ground antenna feed terminal 48. Positive antenna feed terminal 46 may be coupled to an antenna resonating element for antenna 40 (e.g., a fed arm of antenna 40). Ground antenna feed terminal 48 may be coupled to an antenna ground for antenna 40. If desired, antenna 40 may have one or more antenna resonating elements that are not coupled or directly connected to a corresponding positive antenna feed terminal (e.g., a parasitic or unfed arm of antenna 40). The unfed arm(s) in antenna 40 may, if desired, be fed by one or more fed arms of antenna 40 (e.g., via near-field electromagnetic coupling).

Signal conductor 52 may be coupled to positive antenna feed terminal 46 and ground conductor 54 may be coupled to ground antenna feed terminal 48. Other types of antenna feed arrangements may be used if desired. For example, antenna 40 may be fed using multiple feeds each coupled to a respective port of transceiver circuitry 42 over a corresponding transmission line. If desired, signal conductor 52 may be coupled to multiple locations on antenna 40 (e.g., antenna 40 may include multiple positive antenna feed terminals coupled to signal conductor 52 of the same radio-frequency transmission line path 50). Switches may be interposed on the signal conductor between transceiver circuitry 42 and the positive antenna feed terminals if desired (e.g., to selectively activate one or more positive antenna feed terminals at any given time). The illustrative feeding configuration of FIG. 3 is merely illustrative.

During operation, device 10 may communicate with external wireless equipment. If desired, device 10 may use radio-frequency signals conveyed between device 10 and the external wireless equipment to identify a location of the external wireless equipment relative to device 10. Device 10 may identify the relative location of the external wireless equipment by identifying a range to the external wireless equipment (e.g., the distance between the external wireless equipment and device 10) and the angle of arrival (AoA) of radio-frequency signals from the external wireless equipment (e.g., the angle at which radio-frequency signals are received by device 10 from the external wireless equipment).

Figure 4:
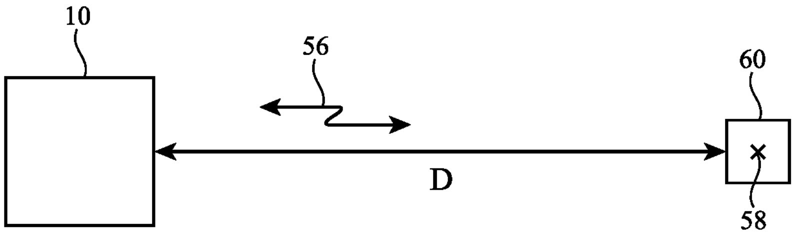
FIG. 4 is a diagram of an illustrative electronic device in wireless communication with an external node in a network in accordance with some embodiments.

FIG. 4 is a diagram showing how device 10 may determine a distance D between device and external wireless equipment such as wireless network node 60 (sometimes referred to herein as wireless equipment 60, wireless device 60, external device 60, or external equipment Node 60 may include devices that are capable of receiving and/or transmitting radio-frequency signals such as radio-frequency signals 56. Node 60 may include tagged devices (e.g., any suitable object that has been provided with a wireless receiver and/or a wireless transmitter), electronic equipment (e.g., an infrastructure-related device), and/or other electronic devices (e.g., devices of the type described in connection with FIG. 1, including some or all of the same wireless communications capabilities as device 10).

For example, node 60 may be a laptop computer, a tablet computer, a somewhat smaller device such as a wrist-watch device, pendant device, headphone device, earpiece device, headset device (e.g., virtual or augmented reality headset devices), or other wearable or miniature device, a handheld device such as a cellular telephone, a media player, or other small portable device. Node 60 may also be a set-top box, a camera device with wireless communications capabilities, a desktop computer, a display into which a computer or other processing circuitry has been integrated, a display without an integrated computer, or other suitable electronic equipment. Node 60 may also be a key fob, a wallet, a book, a pen, or other object that has been provided with a low-power transmitter (e.g., an RFID transmitter or other transmitter). Node 60 may be electronic equipment such as a thermostat, a smoke detector, a Bluetooth® Low Energy (Bluetooth LE) beacon, a Wi-Fi® wireless access point, a wireless base station, a server, a heating, ventilation, and air conditioning (HVAC) system (sometimes referred to as a temperature-control system), a light source such as a light-emitting diode (LED) bulb, a light switch, a power outlet, an occupancy detector (e.g., an active or passive infrared light detector, a microwave detector, etc.), a door sensor, a moisture sensor, an electronic door lock, a security camera, or other device. Device 10 may also be one of these types of devices if desired.

As shown in FIG. 4, device 10 may communicate with node 60 using wireless radio-frequency signals 56. Radio-frequency signals 56 may include Bluetooth® signals, near-field communications signals, wireless local area network signals such as IEEE 802.11 signals, millimeter wave communication signals such as signals at 60 GHz, UWB signals, other radio-frequency wireless signals, infrared signals, etc. In one suitable arrangement that is described herein by example, radio-frequency signals 56 are UWB signals conveyed in one or more UWB communications bands such as the 6.5 GHz and 8 GHz UWB communications bands. Radio-frequency signals 56 may be used to determine and/or convey information such as location and orientation information. For example, control circuitry 28 in device 10 (FIG. 2) may determine the location 58 of node 60 relative to device 10 using radio-frequency signals 56.

In arrangements where node 60 is capable of sending or receiving communications signals, control circuitry 28 (FIG. 2) on device 10 may determine distance D using radio-frequency signals 56 of FIG. 4. The control circuitry may determine distance D using signal strength measurement schemes (e.g., measuring the signal strength of radio-frequency signals 56 from node 60) or using time-based measurement schemes such as time of flight measurement techniques, time difference of arrival measurement techniques, angle of arrival measurement techniques, triangulation methods, time-of-flight methods, using a crowdsourced location database, and other suitable measurement techniques. This is merely illustrative, however. If desired, the control circuitry may use information from Global Positioning System receiver circuitry, proximity sensors (e.g., infrared proximity sensors or other proximity sensors), image data from a camera, motion sensor data from motion sensors, and/or using other circuitry on device 10 to help determine distance D. In addition to determining the distance D between device 10 and node 60, the control circuitry may determine the orientation of device 10 relative to node 60.

Figure 5:
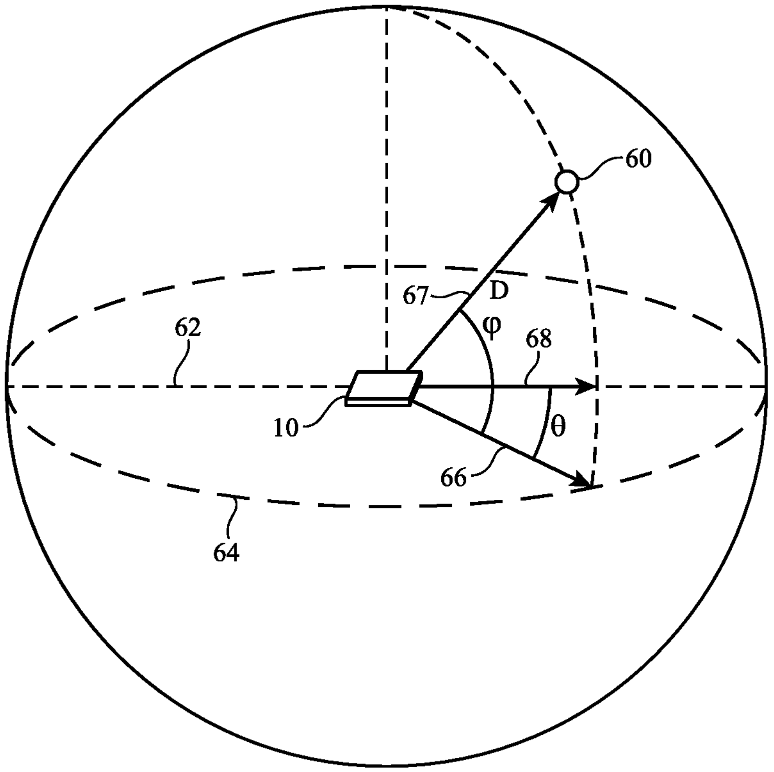
FIG. 5 is a diagram showing how the location (e.g., range and angle of arrival) of an external node in a network may be determined relative to an electronic device in accordance with some embodiments.

FIG. 5 illustrates how the position and orientation of device 10 relative to nearby nodes such as node 60 may be determined. In the example of FIG. 5, the control circuitry on device 10 (e.g., control circuitry 28 of FIG. 2) uses a horizontal polar coordinate system to determine the location and orientation of device 10 relative to node 60. In this type of coordinate system, the control circuitry may determine an azimuth angle θ and/or an elevation angle 9 to describe the position of nearby nodes 60 relative to device 10. The control circuitry may define a reference plane such as local horizon 64 and a reference vector such as reference vector 68. Local horizon 64 may be a plane that intersects device 10 and that is defined relative to a surface of device 10 (e.g., the front or rear face of device 10). For example, local horizon 64 may be a plane that is parallel to or coplanar with display 14 of device 10 (FIG. 1). Reference vector 68 (sometimes referred to as the “north” direction) may be a vector in local horizon 64. If desired, reference vector 68 may be aligned with longitudinal axis 62 of device 10 (e.g., an axis running lengthwise down the center of device 10 and parallel to the longest rectangular dimension of device 10, parallel to the Y-axis of FIG. 1). When reference vector 68 is aligned with longitudinal axis 62 of device 10, reference vector 68 may correspond to the direction in which device 10 is being pointed.

Azimuth angle θ and elevation angle 9 may be measured relative to local horizon 64 and reference vector 68. As shown in FIG. 5, the elevation angle 9 (sometimes referred to as altitude) of node 60 is the angle between node 60 and local horizon 64 of device 10 (e.g., the angle between vector 67 extending between device 10 and node 60 and a coplanar vector 66 extending between device 10 and local horizon 64). The azimuth angle θ of node 60 is the angle of node 60 around local horizon 64 (e.g., the angle between reference vector 68 and vector 66). In the example of FIG. 5, the azimuth angle θ and elevation angle q of node 60 are greater than 0°.

If desired, other axes besides longitudinal axis 62 may be used to define reference vector 68. For example, the control circuitry may use a horizontal axis that is perpendicular to longitudinal axis 62 as reference vector 68. This may be useful in determining when nodes 60 are located next to a side portion of device 10 (e.g., when device 10 is oriented side-to-side with one of nodes 60).

After determining the orientation of device 10 relative to node 60, the control circuitry on device 10 may take suitable action. For example, the control circuitry may send information to node 60, may request and/or receive information from 60, may use display 14 (FIG. 1) to display a visual indication of wireless pairing with node 60, may use speakers to generate an audio indication of wireless pairing with node 60, may use a vibrator, a haptic actuator, or other mechanical element to generate haptic output indicating wireless pairing with node 60, may use display 14 to display a visual indication of the location of node 60 relative to device 10, may use speakers to generate an audio indication of the location of node 60, may use a vibrator, a haptic actuator, or other mechanical element to generate haptic output indicating the location of node and/or may take other suitable action.

In one suitable arrangement, device 10 may determine the distance between the device and node 60 and the orientation of device 10 relative to node 60 using one or more ultra-wideband antennas. The ultra-wide band antennas may receive radio-frequency signals from node 60 (e.g., radio-frequency signals 56 of FIG. 4). Time stamps in the wireless communication signals may be analyzed to determine the time of flight of the wireless communication signals and thereby determine the distance (range) between device 10 and node 60. In implementations where device 10 includes two or more ultra-wideband antennas, angle of arrival (AoA) measurement techniques may be used to determine the orientation of electronic device 10 relative to node 60 (e.g., azimuth angle θ and elevation angle 9).

In angle of arrival measurement, node 60 transmits a radio-frequency signal to device (e.g., radio-frequency signals 56 of FIG. 4). Device 10 may measure a delay in arrival time of the radio-frequency signals between the two or more ultra-wideband antennas. The delay in arrival time (e.g., the difference in received phase at each ultra-wideband antenna) can be used to determine the angle of arrival of the radio-frequency signal (and therefore the angle of node 60 relative to device 10). Once distance D and the angle of arrival have been determined, device 10 may have knowledge of the precise location of node 60 relative to device 10.

Figure 6:
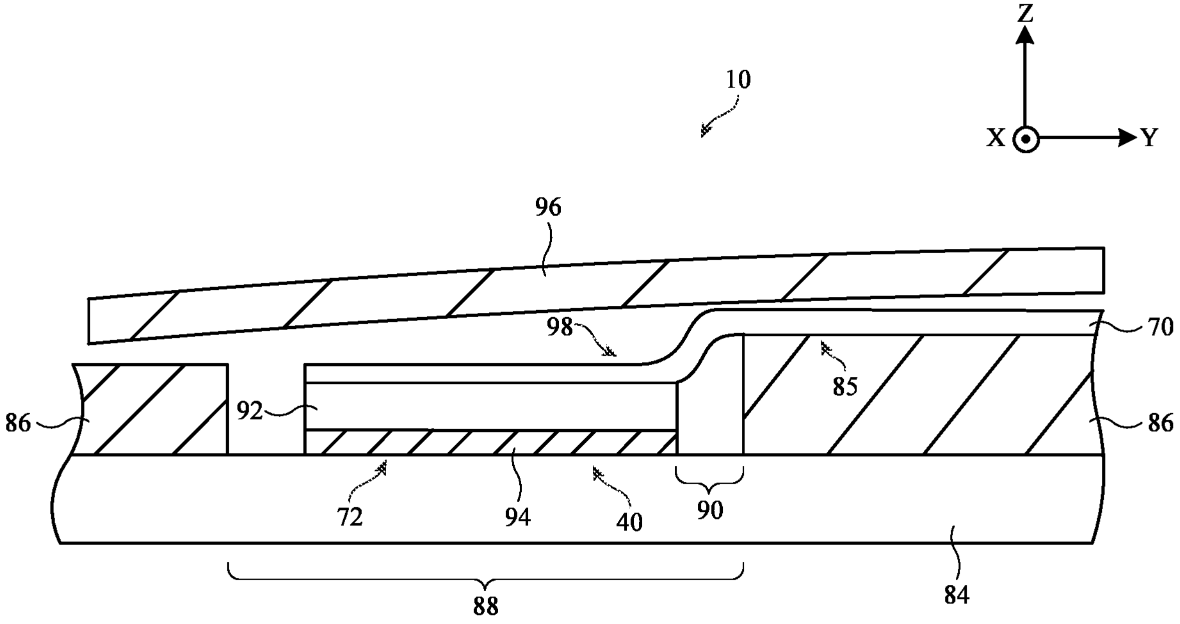
FIG. 6 is a cross-sectional side view showing how an illustrative ultra-wideband may be mounted within an opening in a conductive support plate in accordance with some embodiments.

If desired, an antenna 40 in device 10 (e.g., an antenna 40 that conveys UWB signals) may be mounted to a flexible printed circuit (e.g., a flexible printed circuit substrate). FIG. 6 is a cross-sectional side view showing how the flexible printed circuit may be mounted within device 10. As shown in FIG. 6, antenna 40 may be mounted to flexible printed circuit 70. Flexible printed circuit 70 may have multiple stacked layers of printed circuit material (e.g., polyimide).

Device 10 may include a dielectric cover layer such as dielectric cover layer 84 and a conductive support plate such as conductive support plate 86 layered over (on) dielectric cover layer 84. Dielectric cover layer 84 and conductive support plate 86 may, for example, form a housing wall for device 10 (e.g., rear housing wall 12R of FIG. 1). Conductive support plate 86 may be an integral portion of peripheral conductive housing walls 12W (FIG. 1) or may be welded or otherwise affixed to peripheral conductive housing walls 12W if desired. Conductive support plate 86 may have an opening such as opening 88.

Flexible printed circuit 70 may extend along conductive support plate 86. Portion 72 of flexible printed circuit 70 may extend within opening 88 in conductive support plate 86. An antenna substrate such as substrate 92 may be mounted to portion 72 of flexible printed circuit 70. Antenna 40 may be disposed on substrate 92. Conductive traces 94 may be disposed on substrate 92. Conductive traces 94 (sometimes referred to herein as antenna traces) may be used to form part of the antenna resonating element and/or antenna ground of antenna 40. Antenna 40 may convey UWB signals or other radio-frequency signals through dielectric cover layer 84.

Portion 72 of flexible printed circuit 70 and substrate 92 may be pressed against dielectric cover layer 84 within opening 88, forming a bend such as bend 98 in flexible printed circuit 70. Portion 72 and substrate 92 may, for example, be located between upper surface 85 of conductive support plate 86 and dielectric cover layer 84. Substrate 92 (e.g., some or all of conductive traces 94) may be pressed against (e.g., in direct contact with) dielectric cover layer 84 (e.g., bend 98 may allow substrate 92 to be pressed against dielectric cover layer 84 despite the remainder of flexible printed circuit 70 being disposed outside of opening 88). If desired, adhesive may be used to help adhere substrate 92 and/or conductive traces 94 to dielectric cover layer 84.

If desired, an electromagnetic shield such as conductive shielding layer 96 may be layered over conductive support plate 86 and flexible printed circuit 70. Conductive shielding layer 96 may completely cover opening 88. Conductive shielding layer 96 may be galvanically connected to conductive support plate 86 (e.g., using solder, welds, or other conductive adhesives), may be placed into contact with conductive support plate 86, or may be separated from and capacitively coupled to conductive support plate 86. Conductive shielding layer 96 may include sheet metal, conductive adhesive (e.g., copper tape having an adhesive layer), conductive traces on a dielectric substrate, conductive portions of the housing for device 10, conductive foil, ferrite, or any other desired structures that block radio-frequency signals. In the absence of conductive shielding layer 96, gap 90 may radiate in response to radio-frequency signals from polarizations other than the polarization handled by conductive traces 94. This may introduce undesirable cross-polarization interference on the radio-frequency signals handled by conductive traces 94. The presence of conductive shielding layer 96 may, for example, serve to block these radio-frequency signals from causing gap 90 to radiate, thereby mitigating cross-polarization interference for conductive traces 94.

The example of FIG. 6 is merely illustrative. If desired, conductive components may overlap gap 90 to prevent cross-polarization interference. Conductive shielding layer 96 may be omitted if desired. Gap 90 may have a width of zero mm if desired (e.g., portion 72 of flexible printed circuit 70 may completely fill the lateral area of opening 88). Pressing substrate 92 against dielectric cover layer 84 may help to provide a uniform impedance transition across the entire lateral area of conductive traces 94 from conductive traces 94 to free space at the exterior of device 10 (e.g., without any air gaps or bubbles between conductive traces 94 and dielectric cover layer 84 that would otherwise introduce undesirable impedance discontinuities to the system).

Any desired antenna structures may be used for implementing antenna 40 for conveying UWB signals through dielectric cover layer 84. In one suitable arrangement that is sometimes described herein as an example, planar inverted-F antenna structures may be used for implementing antenna 40. Antennas that are implemented using planar inverted-F antenna structures may sometimes be referred to as planar inverted-F antennas. Planar inverted-F antennas are inverted-F antennas having a planar radiating arm that extends across a corresponding lateral surface area.

Figure 7:
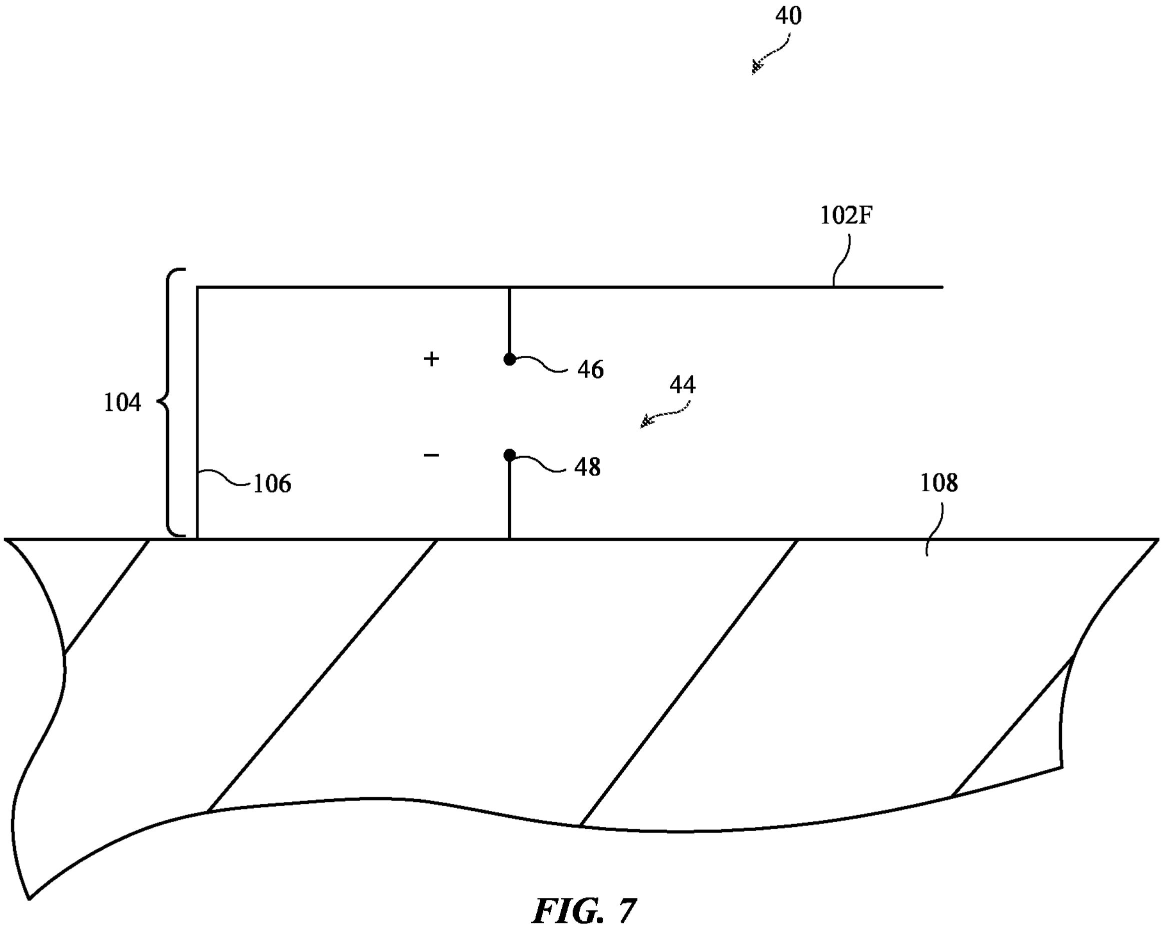
FIG. 7 is a schematic diagram of illustrative inverted-F antenna structures that may be used to form an ultra-wideband antenna in accordance with some embodiments.

FIG. 7 is a schematic diagram of inverted-F antenna structures that may be used to form antenna 40. As shown in FIG. 7, antenna 40 may include an antenna resonating element such as antenna resonating element 104 (sometimes referred to herein as antenna resonator 104 or antenna radiator 104) and an antenna ground such as antenna ground 108 (sometimes referred to herein as ground 108). Antenna resonating element 104 may include one or more resonating element arms 102 (sometimes referred to herein as antenna resonating element arms 102, radiating arms 102, antenna radiating arms 102, or simply arms 102). Each arm 102 may be shorted to antenna ground 108 by a corresponding return path 106.

Antenna 40 may be fed by coupling a transmission line (e.g., a transmission line in radio-frequency transmission line path 50 of FIG. 3) to positive antenna feed terminal 46 and ground antenna feed terminal 48 of antenna feed 44. The arms 102 in antenna resonating element 104 may include one or more fed arms 102F (such as the fed arm 102F shown in FIG. 7) and may include one or more unfed arms 102U (not shown in FIG. 7). Positive antenna feed terminal 46 may be coupled to fed arm 102F and ground antenna feed terminal 48 may be coupled to antenna ground 108. Return path 106 may be coupled between fed arm 102F and antenna ground 108 in parallel with antenna feed 44. The length of fed arm 102F may determine the response (resonant) frequency of the antenna.

While FIG. 7 shows a schematic diagram of an inverted-F antenna, fed arm 102F may extend across a lateral surface area to implement antenna 40 as a planar inverted-F antenna. In the example of FIG. 7, antenna 40 is configured to cover only a single frequency band. To help broaden the bandwidth of antenna 40 (and thus the frequencies in the frequency band covered by antenna 40), antenna 40 may include one or more parasitic antenna resonating elements (sometimes referred to herein as parasitic elements, parasitic arms, or simply as parasitics). The parasitic antenna resonating elements may include an unfed arm 102U. The unfed arm 102U may be indirectly fed by fed arm 102F via near-field electromagnetic coupling.

Figure 8:
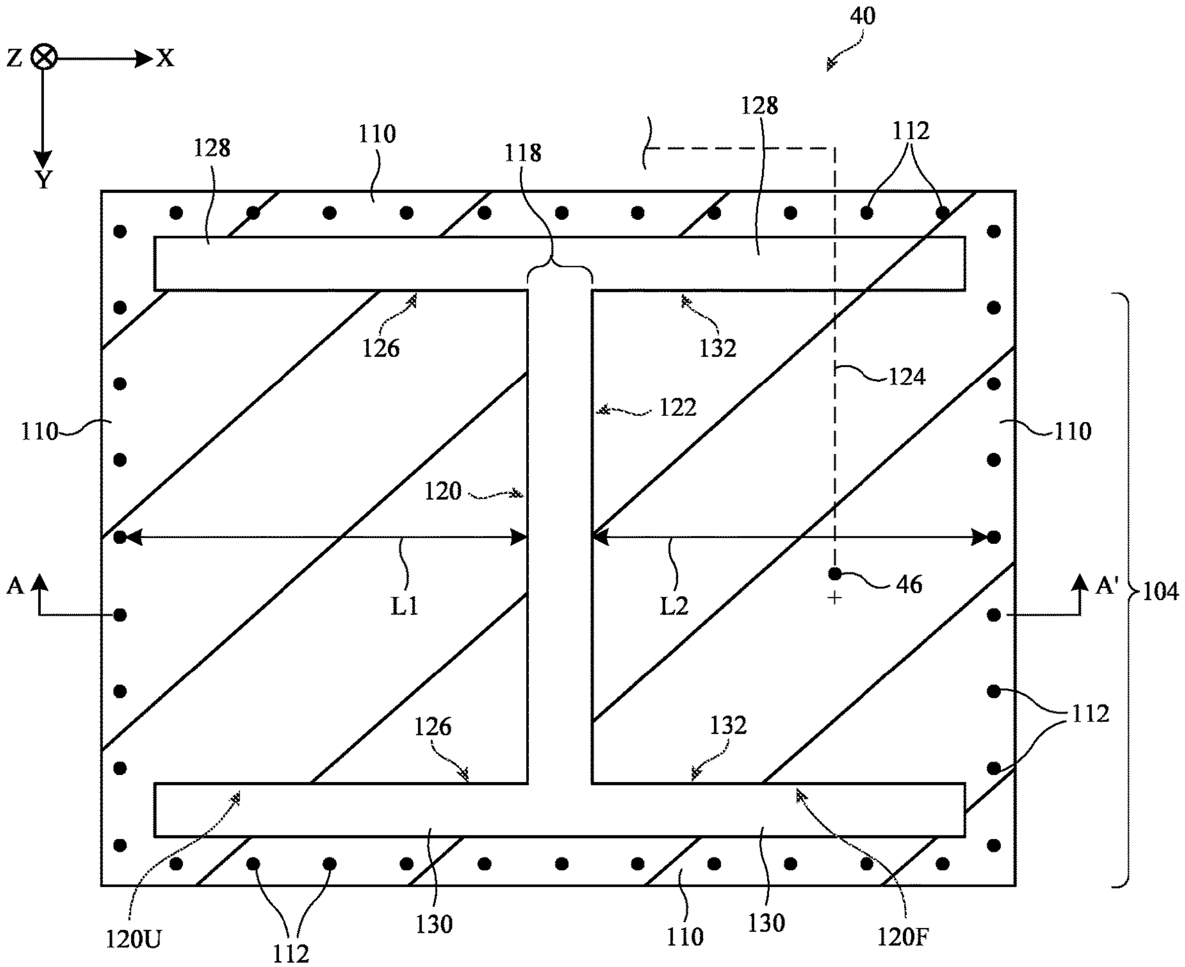
FIG. 8 is a bottom view of an illustrative ultra-wideband antenna having fed and unfed arms in accordance with some embodiments.

FIG. 8 is a bottom-up view showing one example of how antenna 40 may include both fed arm 102F and an unfed arm 102U. Antenna 40 of FIG. 8 may be an antenna that conveys UWB signals (e.g., as part of a doublet of UWB antennas, a triplet of UWB antennas, or as a standalone UWB antenna for measuring time of flight). As shown in FIG. 8, antenna resonating element 104 of antenna 40 may be formed from conductive structures such as conductive traces on a surface of the underlying substrate 92. Substrate 92 may be formed from any desired dielectric materials such as epoxy, plastic, ceramic, glass, foam, polyimide, liquid crystal polymer, or other materials. In one suitable arrangement that is described herein as an example, substrate 92 is a flexible printed circuit substrate having stacked layers of flexible printed circuit material (e.g., polyimide, liquid crystal polymer, etc.).

As shown in FIG. 8, antenna resonating element 104 may include fed arm 102F. Fed arm 102F may have a planar shape with a length L2 (e.g., parallel to the X-axis). Fed arm 102F may have a perpendicular width (e.g., parallel to the Y-axis) such that fed arm 102F has a planar shape that laterally extends in a given plane (e.g., the X-Y plane of FIG. 8) parallel to the underlying antenna ground (e.g., antenna ground 108 of FIG. 7). Positive antenna feed terminal 46 may be coupled to fed arm 102F.

Antenna resonating element 104 may also include an unfed arm 102U opposite fed arm 102F. Unlike fed arm 102F, unfed arm 102U is not coupled or directly (galvanically) connected to a positive antenna feed terminal such as positive antenna feed terminal 46. Unfed arm 102U may have a planar shape with a length L1 (e.g., parallel to the X-axis). Unfed arm 102U may have a perpendicular width (e.g., parallel to the Y-axis) such that unfed arm 102U has a planar shape that laterally extends in a given plane (e.g., the X-Y plane of FIG. 8) parallel to the underlying antenna ground (e.g., antenna ground 108 of FIG. 7).

Length L2 may be selected to configure antenna resonating element 104 to radiate in a UWB frequency band such as UWB Channel 9. For example, length L2 may be approximately equal to (e.g., within 15% of) one-quarter of the effective wavelength corresponding to a frequency in the UWB frequency band. The effective wavelength is modified from a corresponding free-space wavelength by a constant value associated with the dielectric material used to form substrate 92 (e.g., the effective wavelength is found by multiplying the freespace wavelength by a constant value that is based on the dielectric constant $d_k$ of substrate 92).

Length L1 may be selected to configure unfed arm 102U to radiate at slightly different frequencies from fed arm 102F, thereby serving to broaden the overall frequency response and bandwidth of antenna 40.

If desired, an electromagnetic shielding (guard) ring such as grounded shielding ring 110 may laterally surround antenna resonating element 104 at the upper-most surface of substrate 92. Grounded shielding ring 110 may be formed from conductive traces on the surface of substrate 92. The conductive traces of grounded shielding ring 110 may be shorted to the antenna ground (e.g., underlying planar ground traces) by fences of conductive vias 112 extending through substrate 92. Each conductive via 112 may be separated from one or more adjacent conductive vias 112 by a sufficiently narrow distance such that the fence of conductive vias 112 appears as an open circuit (infinite impedance) to antenna currents in the UWB frequency band handled by antenna 40. As an example, each conductive via 112 in the fence may be separated from one or more adjacent conductive vias 112 by one-sixth of a wavelength covered by antenna 40, one-eighth of a wavelength covered by antenna 40, one-tenth of a wavelength covered by antenna 40, one-fifteenth of a wavelength covered by antenna 40, less than one-fifteenth of a wavelength covered by antenna 40, etc. Grounded shielding ring 110 may serve to isolate and shield antenna 40 from electromagnetic interference.

Grounded shielding ring 110, conductive vias 112, and the underlying planar ground traces on substrate 92 may collectively form antenna ground 108 of FIG. 7 and may form (define) a conductive antenna cavity for antenna 40 that serves to optimize radio-frequency performance (e.g., antenna efficiency and bandwidth) for antenna 40. The antenna ground may include ground traces on one or more layers of substrate 92 beneath the upper-most layer of substrate 92. The ground traces may include planar ground traces extending underneath (e.g., overlapping) substantially all of antenna 40. If desired, the ground traces may also include a ring of ground traces or ground traces in other shapes overlapping grounded shielding ring 110 but formed on a layer of substrate 92 between the planar ground trace and the upper-most layer of substrate 92. Each layer of ground traces in antenna 40 may be coupled together using conductive vias if desired (e.g., so that all of the ground traces are held at the same ground potential).

Antenna 40 of FIG. 8 may be fed using a radio-frequency transmission line path (e.g., radio-frequency transmission line path 50 of FIG. 3). The radio-frequency transmission line path may include a transmission line such as stripline or microstrip transmission line, as examples. The transmission line may have signal traces 124 (e.g., forming a part of signal conductor 52 of FIG. 3) coupled to positive antenna feed terminal 46 on fed arm 102F. Fed arm 102F is therefore fed by signal traces 124 and positive antenna feed terminal 46. Unfed arm 102U is not coupled to any radio-frequency transmission line path.

Fed arm 102F of antenna 40 may extend from a first (right) segment of grounded shielding ring 110 leftwards to an opposing radiating edge 122 (e.g., length L2 may be measured from grounded shielding ring 110 to radiating edge 122). Fed arm 102F may have longitudinal edges 132 that extend along length L2 (e.g., parallel to the X-axis) from grounded shielding ring 110 to radiating edge 122. The uppermost edge 132 may be separated from grounded shielding ring 110 by gap 128. Gap 128 may have a longitudinal axis extending parallel to the X-axis. The lowermost edge 132 may be separated from grounded shielding ring 110 by gap 130. Gap 130 may have a longitudinal axis extending parallel to the X-axis (e.g., gaps 128 and 132 may extend in parallel). The conductive vias in the first segment of grounded shielding ring 110 (e.g., the right side of grounded shielding ring 110) may form a return path to ground for fed arm 102F (e.g., return path 106 of FIG. 7).

Unfed arm 102U of antenna 40 may extend from a second (left) segment of grounded shielding ring 110 rightwards to opposing radiating edge 120 (e.g., length L1 may be measured from grounded shielding ring 110 to radiating edge 120). Radiating edge 120 may extend parallel to radiating edge 122. Unfed arm 102U may have longitudinal edges 126 that extend along length L1 (e.g., parallel to the X-axis) from grounded shielding ring 110 to radiating edge 120. The uppermost edge 126 may be separated from grounded shielding ring 110 by gap 128. The lowermost edge 126 may be separated from grounded shielding ring 110 by gap 130. Edges 126 and 132 may extend in parallel to each other. The conductive vias in the second segment of grounded shielding ring 110 (e.g., the left side of grounded shielding ring 110) may form a return path to ground for unfed arm 102U (e.g., return path 106 of FIG. 7).

Radiating edge 122 of fed arm 102F may be separated from radiating edge 120 of unfed arm 102U by gap 118 (e.g., radiating edge 122 may face radiating edge 120). Gap 118 may extend parallel to the Y-axis (e.g., perpendicular to edges 126 and 132 and gaps 128 and 130). Gap 118 may couple gap 128 to gap 130 (e.g., gaps 128, 118, and 130 may collectively form an H-shaped gap in the conductive traces the surface of substrate 92). Gaps 118, 128, and 130 may sometimes be referred to herein as slots (e.g., elongated slots) or openings in the conductive traces on the surface of substrate 92.

During radio-frequency transmission, signal traces 124 convey antenna currents to fed arm 102F over positive antenna feed terminal 46. The antenna currents flow around the edges of fed arm 102F. The electric fields produced by the antenna currents on fed arm 102F may exhibit peak magnitudes at radiating edge 122 (e.g., within gap 118). This may configure fed arm 102F (radiating edge 122) to cause (induce) corresponding antenna currents to flow on the edges of unfed arm 102U (e.g., via near-field electromagnetic coupling across gap 118). The antenna currents on fed arm 102F and unfed arm 102U may radiate corresponding radio-frequency signals into free space. Conversely, during signal reception, antenna currents produced on unfed arm 102U by incident radio-frequency signals may be coupled onto fed arm 102F via near-field electromagnetic coupling across gap 118 and may be passed to positive antenna feed terminal 46. In other words, fed arm 102F may indirectly feed unfed arm 102U via near-field electromagnetic coupling across gap 118 despite the fact that unfed arm 102U does not have its own antenna feed. The corresponding resonance of unfed arm 102U may contribute to the frequency response of fed arm 102F, thereby broadening the bandwidth of antenna 40 within the UWB frequency band (e.g., such that the antenna efficiency of antenna 40 exceeds a threshold value across at least the entire 500 MHz bandwidth of the UWB frequency band, such as the 6.5 GHz UWB band or the 8 GHz UWB band). Unfed arm 102U may sometimes also be referred to as a parasitic arm 102U (e.g., a grounded parasitic) that is parasitically coupled to fed (non-parasitic) arm 102F. The example of FIG. 8 is merely illustrative. Fed arm 102F and unfed arm 102U may have other shapes having any desired number of curved and/or straight edges.

Figure 9:
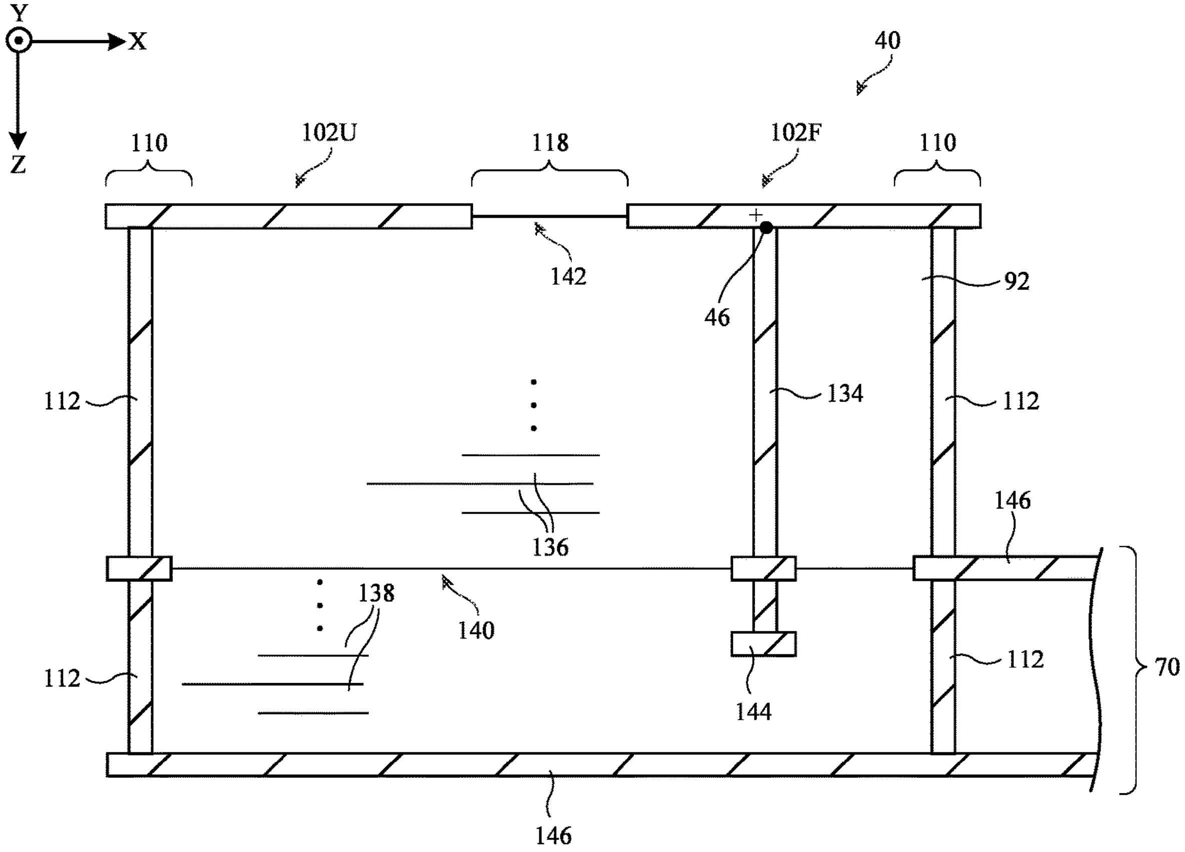
FIG. 9 is a cross-sectional side view of an illustrative ultra-wideband antenna having fed and unfed arms in accordance with some embodiments.

FIG. 9 is a cross-sectional side view of antenna 40 of FIG. 8 (e.g., as taken along line AA' of FIG. 8). As shown in FIG. 9, unfed arm 102U, fed arm 102F, and grounded shielding ring 110 may be formed from conductive traces on surface 142 of substrate 92 (e.g., may form conductive traces 94 of FIG. 6). Substrate 92 may include one or more stacked layers 136 of dielectric material (e.g., flexible printed circuit material such as polyimide or liquid crystal polymer, ceramic, etc.). This example is merely illustrative and, if desired, one or more additional layers 136 of substrate 92 may be disposed over surface 142.

Substrate 92 may be mounted to surface 140 of flexible printed circuit 70, which includes a tail that extends beyond the lateral outline of antenna 40. Flexible printed circuit 70 may include one or more stacked layers 138 of dielectric material (e.g., flexible printed circuit material). A radio-frequency transmission line for antenna 40 may extend along flexible printed circuit 70 and may extend into substrate 92. Flexible printed circuit 70 may include conductive traces that form a ground plane (layer) such as planar ground traces 146. Planar ground traces 146 may form part of the antenna ground for antenna 40. Planar ground traces 146 may be disposed on one or more surfaces of flexible printed circuit 92 and/or may be embedded within layers 138 of flexible printed circuit 70. Planar ground traces 146 may form a part of the radio-frequency transmission line for antenna 40 and may extend under antenna 40. Conductive vias may extend through flexible printed circuit 70 to short the planar ground traces 146 together if desired.

The signal traces 144 of the radio-frequency transmission line (e.g., signal traces 124 of FIG. 8) may also be disposed on one or more layers 138 of flexible printed circuit 70. Conductive feed via 134 may extend through substrate 92 and may couple signal traces 144 to positive antenna feed terminal 46 at fed arm 102F. Conductive vias 112 may couple grounded shielding ring 110 to one or more layers of planar ground traces 146 on flexible printed circuit 70. Conductive vias 112, unfed arm 102U, fed arm 102F, grounded shielding ring 110, and planar ground traces 146 may define a continuous antenna cavity (volume) for antenna 40. The example of FIG. 9 is merely illustrative and, in general, any desired stack up may be used to dispose antenna 40 on substrate 92 and flexible printed circuit 70.

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made by those skilled in the art without departing from the scope and spirit of the described embodiments. The foregoing embodiments may be implemented individually or in any combination.

What is claimed is:

1. An antenna comprising:
- a ring of conductive traces having first and second segments;
- a fed arm having a first end that contacts the first segment and having a first radiating edge opposite the first end;
- an antenna feed terminal coupled to the fed arm; and
- an unfed arm having a second end that contacts the second segment and having a second radiating edge opposite the second end.

2. The antenna of claim 1, wherein the first radiating edge is separated from the second radiating edge by a gap.

3. The antenna of claim 2, wherein the fed arm is configured to indirectly feed the unfed arm via near-field electromagnetic coupling across the gap.

4. The antenna of claim 3, wherein the first radiating edge extends parallel to the second radiating edge.

5. The antenna of claim 2, wherein the fed arm has first and second edges that extend from the first end to the first radiating edge and the unfed arm has third and fourth edges that extend from the second end to the second radiating edge.

6. The antenna of claim 5, wherein the first, second, third, and fourth edges extend parallel to each other.

7. The antenna of claim 1, wherein the ring of conductive traces has a third segment that couples the first segment to the second segment and has a fourth segment opposite the third segment that couples the first segment to the second segment.

8. The antenna of claim 7, wherein the first radiating edge is separated from the second radiating edge by a first gap, the fed arm and the unfed arm are separated from the third segment by a second gap, and the fed arm and the unfed arm are separated from the fourth segment by a third gap, and the first gap couples the second gap to the third gap.

9. The antenna of claim 1, further comprising:
- ground traces;
- a first fence of conductive vias that couple the ground traces to the first segment; and
- a second fence of conductive vias that couple the ground traces to the second segment.

10. An antenna comprising:
- a substrate having a surface;
- a ring of conductive traces disposed on the surface;
- an arm disposed on the surface and extending from the ring of conductive traces;
- an antenna feed coupled to the arm; and
- a parasitic disposed on the surface and extending from the ring of conductive traces opposite the arm, wherein the arm is configured to indirectly feed the parasitic via near-field electromagnetic coupling.

11. The antenna of claim 10, wherein the arm extends from the ring of conductive traces to a first edge, the parasitic extends from the ring of conductive traces to a second edge, and the first edge is separated from the second edge by a slot.

12. The antenna of claim 10, further comprising:
- ground traces on the substrate; and
- fences of conductive vias that extend through the substrate and that couple the ring of conductive traces to the ground traces.

13. The antenna of claim 12, wherein the fences of conductive vias comprise a first fence of conductive vias that couples the arm to the ground traces and a second fence of conductive vias that couples the parasitic to the ground traces.

14. An electronic device comprising:
- a substrate;
- a first antenna arm on the substrate;
- a radio-frequency transmission line path coupled to the first antenna arm at an antenna feed terminal;
- a second antenna arm on the substrate, wherein the second antenna arm is separated from the first antenna arm by a slot and is indirectly fed by the first antenna arm, the first and second antenna arms being configured to radiate in a frequency band;

ground traces;

first conductive vias that couple the first arm to the ground traces through the substrate; and second conductive vias that couple the second arm to the ground traces through the substrate.

15. The electronic device of claim 14, further comprising a ring of conductive traces on the substrate, the first and second antenna arms being coupled to the ring of conductive traces.

16. The electronic device of claim 14, further comprising:

a flexible printed circuit, wherein the substrate is mounted to the flexible printed circuit.

17. The electronic device of claim 1, further comprising:

a ground trace; and a conductive via that couples the ring of conductive traces to the ground trace.

18. The electronic device of claim 10, further comprising:

a ground trace; and a conductive via that couples the ring of conductive traces to the ground trace.

19. The antenna of claim 10, wherein the arm is directly connected to the ring of conductive traces.

20. The antenna of claim 10, wherein the arm and the parasitic comprise conductive traces on the surface.

* * * * *